INVENTOR
ALEXANDER SIEBENBERG

BY *Fred M. Vogel*

AGENT

INVENTOR
ALEXANDER SIEBENBERG
BY
AGENT

INVENTOR
ALEXANDER SIEBENBERG

United States Patent Office 2,916,732
Patented Dec. 8, 1959

2,916,732

CIRCUIT-ARRANGEMENT FOR MEASURING OR INDICATING ELECTRICAL VALUES BY CATHODE-RAY DEFLECTION

Alexander Siebenberg, Hamburg-Fuhlsbuttel, Germany, assignor, by mesne assignments, to North American Philips Company, Inc., New York, N.Y., a corporation of Delaware Application April 11, 1955, Serial No. 500,531

Claims priority, application Germany June 19, 1954

25 Claims. (Cl. 340—253)

The present invention relates to circuit arrangements for indicating electrical values. More particularly, the invention concerns circuit arrangements for measuring or indicating electrical values (measuring value) by cathode-ray tube deflection. Tubes of this type such as, for example, oscillograph tubes, tuning indicators, cathode-ray switches (electron beam is directed to different collecting electrodes and thus establishes electrical connections), are often operated with voltages exceeding the supply voltages used for other circuit elements or require an auxiliary voltage of negative polarity relative to a reference value of preferably fixed potential, hereinafter termed "ground," which voltages are normally not available. This causes difficulties, since extra direct voltage supplies require considerable equipment.

In many cases, it is much simpler to use an alternating voltage supply having a line frequency of 50 to 60 cycles per second. At least if the value to be indicated or to be measured (measuring value) varies much more slowly than the supply voltage, it is possible to operate such a cathode-ray tube with alternating voltage, due to the well-known visual inertia or the inertia of mechanical measuring apparatus or the like. However, not only the voltages of the deflection electrode(s), but also those of the electron-collecting electrode (for example the luminous screen or the like provided on a conductive base, hereinafter geenrally termed "anode") and, as the case may be, one or more auxiliary electrodes may influence the intensity and/or sharpness of the beam and the deflection of the electron beam. If the deflection of the electron beam should be independent of the alternating supply voltage, all the voltages between the electrodes must at all times have the same ratio, that is, such voltages should vary proportionally.

This condition is fulfilled with sufficient accuracy, and in a circuit-arrangement for measuring or indicating electrical values by deflecting the electron beam of a tube, preferably a tuning indicator tube, satisfactory indication of slowly varying measuring values is achieved, without additional auxiliary direct voltages, by the circuit arrangements of the present invention. In accordance with the invention, the anode and the deflection electrodes of the cathode-ray tube are supplied with substantially alternating voltages having substantially the same curve, and at least one of said alternating voltages is amplitude-controlled in accordance with the measuring value.

The alternating voltages actually set up at the electrodes of the indicator tube are vital. However, the alternating voltages are preferably measured at no load relative to an optional point, particularly of fixed potential, and subsequently, in certain embodiments of the invention, the difference or sum of each two voltages is formed, which voltages are applied to two different electrodes of the indicator tube.

The alternating voltages may also comprise an appreciable direct voltage component which, as the case may be, exceeds the alternating voltage amplitude so that the opposite potential is not obtained. Such alternating voltages, which may be available in rectifier apparatus, also act as pure alternating voltages, since the indicator tube (and possibly also the amplifier tube(s)) are often sufficiently conductive to render e.g. a fluorescent screen luminous only at high voltages, consequently at the half waves or peaks determined by the alternating voltage. If a predetermined deflection is desired in the presence of a direct voltage in an alternating voltage for a cathode-ray tube, all the differences of the alternating voltages concerned should percentagewise comprise approximately the same direct voltage components. The additional potentials, produced as a result of the difference voltages, should have no effect on the indicator tube and are compensated. These potentials may have any chosen reference point, for example, a ground connecting point of a plurality of transformer windings, relative to the positive terminal of a grounded source of direct voltage. Frequently, the conditions are particularly simple if the reference point is chosen to be ground or the cathode of the indicator tube.

No particular conditions are imposed on the form of the curve of the alternating voltages used, except that their differences should at all times be proportional (similar) with respect to one another, which requires that they be in phase, especially in their positive waveforms.

The voltage waveform uniformity is, of course, only necessary as long as an appreciable current flows in the indicator tube for an indication or measurement; during the cut-off time, the tube may be supplied with any desired voltages. Thus, for example, a voltage obtained by simple rectification and only consisting of positive halfwaves is frequently equivalent to a complete alternating voltage.

The desired deflection variation for indicating or measuring purposes is obtained by amplitude-control of one of the alternating voltages in accordance with the measuring value. This is achieved in a simple manner by supplying the measuring value to the grid of an amplifier tube to whose other electrodes, which are usually supplied with constant direct voltage, the alternating voltages are applied, so that the controlled alternating voltage appears at the output electrode, preferably the anode.

In order that the invention may be readily carried into effect, it will now be described with reference to the accompanying drawings, given by way of example, in which:

Fig. 1 shows a circuit-arrangement, in which a slowly variable measuring value ("direct voltage") is supplied through a preamplifier to an indicator tube of the tuning indicator type (cf. indicating system of tube EM 34).

Figure 1:
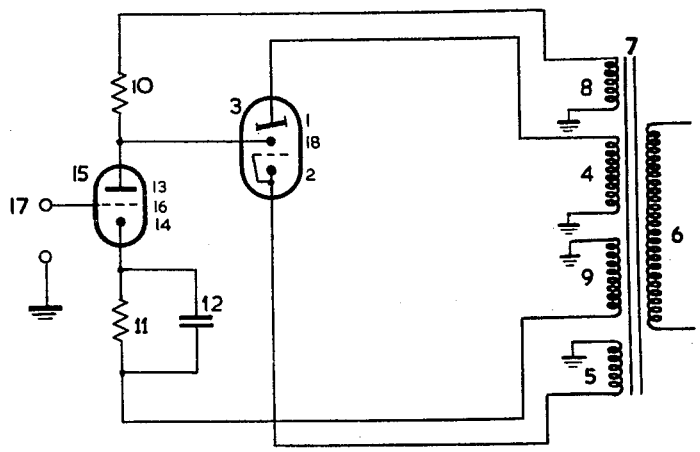
Fig. 1 is a schematic diagram of an embodiment of the circuit arrangement of the present invention.

An anode 1, which at the same time acts as a luminous screen, and a cathode 2 (together with the intensity control-grid associated therewith) are connected to windings 4 and 5 of a transformer 7 supplied from the A.C. supply source 6. An anode 13 of an amplifying triode 15 is connected to another winding 8 of the transformer through an anode resistor 10, and a cathode 14 of the amplifying triode 15 is connected to another winding 9 of the transformer. The measuring value is applied through a terminal 17 and ground to a control grid 16 of the tube 15. Windings 4, 5, 8 and 9 are also connected to ground through their second terminals.

The winding 8 supplies the amplifier tube 15 with the required anode voltage. Through the cathode auxiliary winding 9 the tube 15 receives a bias to compensate any constant fundamental voltage contained in the measuring value. If this fundamental voltage is negative the winding 9 relative to ground has to supply a voltage of opposite phase with respect to the supply winding 8. If the fundamental bias is positive the cathode voltage from the winding 9 should be in phase with the voltage from the winding 8. Particularly if the measuring value to be indicated is variable in a very wide range exceeding the maximum control range of the amplifier tube 15, the performance range can be extended in a known manner known through negative feedback by means of a resistor 11 connected in the cathode circuit, which resistor may be at least partly shunted by a comparatively large capacitor 12. The time constant of the parallel combination thus formed should be considerable relative to the cycle of the alternating voltage so as to practically obtain a counter direct voltage supply. In this case, the cathode-auxiliary alternating voltage has to be transformed into a voltage of larger amplitude and of opposite phase with respect to the winding 8 so as to obtain a more negative cathode supply voltage in the performance range.

A deflection electrode (control stage) 18 of the indicator tube 3 is conductively connected to the anode of the amplifier tube 15. As a result of the rating of the amplifier with tube 15, the range in which the voltage on the deflection electrode 18 varies is fixed, the working point of performance range of the indicator tube 3 then being adjustable by means of the voltages of the windings 4, 5.

The operation of the circuit-arrangement and control of the indication of an indicator tube 3 are obvious when it is assumed that the internal resistance of the tube 15 is brought to a given constant value (this practically occurs with sufficient accuracy) by the measuring value which is to be regarded as a direct voltage. The members 10, 15 are then to be regarded as controlled potentiometers an dthe voltage on the deflection electrode 18 is a fixed fraction of the alternating voltages on the indicator tube 3. Hence, the ratio of the voltages between the electrodes of the indicator tube 3 are at all times constant but dependent upon the value of the internal resistance of tube 15, which resistance depends upon the measuring value. Consequently, deflection of the electron beam of the tube 3, which deflection is controlled only by the measuring value, occurs independently of variations of the alternating voltage and the form of its curve. The luminosity varies periodically with the alternating voltage, it is true, but if the frequency is sufficiently high, this creates no difficulties.

The tube 15 not only acts as an amplifier, but acts also as a blocking tube between the voltage of measuring value and the indicator tube; real voltage amplification is not always necessary.

Since the internal resistance of the tube 3 in the performance range, notably in the proximity of the blocking point, does not actually vary jumpwise but gradually, the deflection is sometimes slightly inaccurate. This evidences itself, for example, as blurred edges of a width-controlled luminous sector. On practice, however, such blur is slight and does not impair the indication of the measuring value.

If only alternating voltage appears in the supply and control circuits of the tubes 3 and 15, the two tubes are made conductive and blocked about simultaneously. However, different angles of current flow may be selected for said tubes by the introduction of direct voltage into a supply circuit.

If, on account of a negative direct voltage in the anode supply circuit or a positive direct voltage in the cathode supply circuit of the tube 3, its angle of current flow is smaller than 180°, the indication can be suppressed in the parts of the characteristic where the tube 15 operates in the starting current range. The tube 3 is not made conductive before an approximately constant resistance occurs in tube 15 which only slightly depends upon the anode voltage variation and is only controlled by the measuring value. This permits any blur at the edges of the electron beam of the tube 3 to be reduced.

When an additional positive voltage in the anode circuit or a negative voltage in the cathode circuit is supplied to the indicator tube 3, the angle of current flow exceeds 180° and consequently increases with respect to the amplifier tube 15. In this case, the tube 3 indicates while the tube 15 is still blocked. Consequently, there is an indication of the constant value at which the deflection electrode 18 is not controlled when the tube 15 becomes conductive, such indication changing to the value determined by the measuring value upon operation of the circuit. Since this change-over is repeated during each alternating voltage cycle, two values are obtained, one of which is fixed and may consequently serve as a zero mark, reference value or the like. The fixed mark does not depend upon the bias, however, but is only determined by the rating of the tube 3, said mark corresponding to that electron-beam deflection which occurs if the deflection electrode and the anode are directly connected together.

Since the relative value of the angle of current flow is vital, if the aforesaid effects are to be obtained, the angle of current flow may alternatively be increased by an additional positive direct voltage in the anode supply or a negative direct voltage in the cathode supply of the amplifier tube 15 so as to restrict the indication to a central portion of the half waves passing through the tube 15, thus avoiding blur due to curvature of the characteristic. Conversely, the angle of current flow can be reduced and an indication of a fixed mark can be produced by means of an additional negative direct voltage in the anode supply or a positive direct voltage in the cathode supply of the tube 15. The luminosity of the fixed mark can be changed into that of the mark of measuring value by the ratio between the angle of current flow of the indicator tube 3 and the angle of current flow of the amplifier tube 15.

The direct voltage may be supplied to the anode supply point through an alternating current stop, for example an ohmic resistor, the alternating voltage through a direct voltage stop preferably a capacitor.

Since the tubes 3 and 15 are conductive only in one direction, so that rectification occurs, the supplies should pass direct current. This direct current may also be used to bring about a possibly desired positive direct voltage component in the cathode or a negative direct voltage component in the anode in order to vary the angle of current flow, which is effected by means of a capacitor-bridged resistor connected in the supply conductor concerned. The time constant of the RC circuit is chosen to exceed the cycle of the alternating voltage to avoid alternating voltage negative feedback. Unbridged negative feedback, or work, resistors in addition to the RC circuits are preferably utilized for storing direct voltage.

Such an RC circuit 11, 12 is shown in Fig. 1 in the cathode circuit of tube 15. It is to be taken into account that the average direct current through the tubes 3 and 15 is not constant, but depends upon the measuring value (since the current through the indicator tube 3 likewise varies with the voltage on the deflection electrode). In accordance with the measuring value, a negative feedback then occurs in the indication, thus also reducing any undesired variation of the angle of current flow. Alternatively, the counter-voltage set up at the RC circuit may be stabilized by means of an additional current supplied from a positive supply through a resistor.

Naturally, it is possible to particularly associate the windings 4, 8 and 5, 9, respectively, and to create any voltage differences by derivation.

As an alternative, the voltage may be reduced by voltage division and the ground point may be fixed by derivation from the voltage divider. However, the voltage divider should also pass direct current on the side of the tubes 3 and 15.

Again, the rating should be such that a voltage divider resistor simultaneously serves at least partly as a work resistor or cathode resistor for the connected tubes. One of the alternating voltages, particularly for the cathode of the indicator tube 3 (derived from the winding 5), may be zero so that the division concerned is directly grounded.

In accordance with the construction of the indicator tube 3, it may be necessary to connect a non-bridged resistor in its cathode circuit to permit variation of the indication characteristic of the tube 3 and stabilization of the performance point or performance range.

Figure 2:
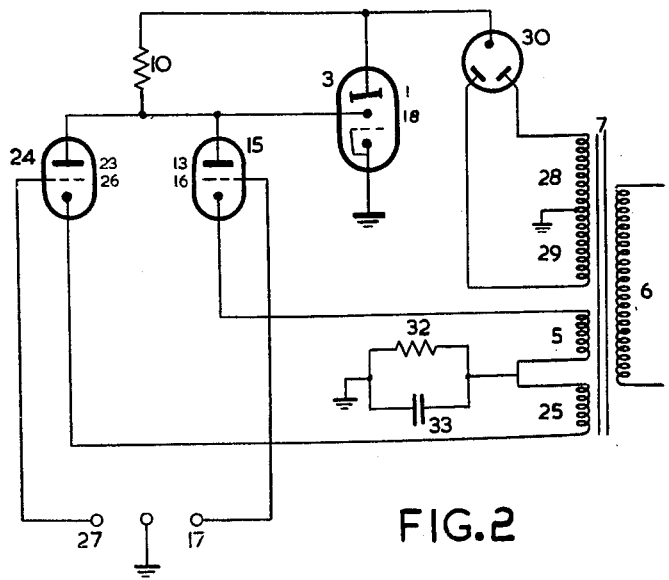
Fig. 2 is a schematic diagram of another embodiment of the circuit arrangement of the present invention.

Fig. 2 shows a circuit arrangement resembling that shown in Fig. 1, but in which the anode 23 of a second amplifier tube 24 is connected to the anode 13 of the amplifier tube 15 and consequently also to the deflection electrode 18 of tube 3 and the work resistor 10.

The cathodes of tubes 15 and 24 are supplied with separate cathode auxiliary alternating voltages in phase opposition which are taken from grounded windings 5 and 25 of the transformer 7. As a result thereof, the amplifier tubes 15 and 24 are alternately made conductive and cut off so that the voltages of measuring value active on their grids 16, 26 through terminals 17, 27, respectively, are alternately supplied to the indicator tube 3 where they are simultaneously indicated visually. Since control by the two measuring values actually occurs at different instants, two measuring values can be indicated without any reaction between them.

Since only one deflection electrode 18 is used in tube 3, the work resistor 10 is connected in common to the tubes 15 and 24. The source of anode voltage has to supply to the resistor 10 a voltage which supplies a half wave approximately proportional to the cathode auxiliary voltage on making either amplifier tube conductive. Such a supply voltage is obtained in a simple manner by full-wave rectification, for example from push-pull transformer windings 28 and 29 with grounded junction point, through a full-wave rectifier 30; a charging capacitor then being dispensed with.

In the circuit-arrangement of Fig. 2, the amplifier tubes 15, 24 are each conductive through approximately 180° of the alternating voltage cycle and if the input voltages do not contain negative direct voltage components are not cut off with certainty. A fixed value indication, in the present circuit arrangement, is readily obtainable by a positive anode voltage component, hence by an increase in the angle of current flow of the indicator tube due to the insufficient interval in which the indicator tube 3 is not controlled by the amplifier tubes 15 and 24. This disadvantage is avoided by means of a positive cathode bias for the amplifier tubes 15 and 24, for example by inserting a resistor-capacitor circuit of adequate value in the lead between the point connecting the windings 5 and 25 and ground. Naturally, said RC circuit bias may alternatively be connected either in one or in each cathode lead or be replaced by a source of direct voltage as available. Such a direct voltage source may comprise, for example, gas-tight storage cells, adapted to be permanently charged without any risk and without any substantial variation of the terminal voltage, since in this circuit arrangement no discharge occurs because only counter voltage supplies are concerned.

If the negative feedback should only extend to the average value of the input voltage and its difference should be indicated without being influenced, a capacitor 33 is required to produce a counter voltage active in both half cycles as a result of its storage effect, since the tubes 15 and 24 are conductive in different halves of the cycle.

A decrease of the angle of current flow of tubes 15 and 24 is alternatively possible, as has been stated with reference to Fig. 1, by shunting at least a part of the work resistor 10 with a capacitor, or by introducing a source of direct voltage.

It is to be noted that, due to the direct voltage components in one of the supply conductors, particularly the anode or cathode leads, the condition of proportionality of the voltages is no longer strictly fulfilled at each instant if the same ratio between direct voltage and alternating voltage amplitude does not exist in each anode and cathode branch of the tubes 3, 15 and 24. Since, however, the direct voltage components are generally small relative to the alternating voltage amplitude and visual indication or measurement primarily occurs in the proximity of the peak value of the alternating voltages, the discrepancies occurring in practice are minute and do not create difficulties.

In the circuit-arrangement shown in Fig. 2, it is possible to connect negative feedback resistors, particularly in the cathode lead, and the the cathode auxiliary voltage may, if desired, be taken from the double winding 28, 29 by means of at least one votlage divider.

In a circuit-arrangement as shown in Fig. 2, the indication is the same if the measuring value is the same. This may sometimes be troublesome in ascertaining whether one or the other measuring value is higher.

Figure 3:
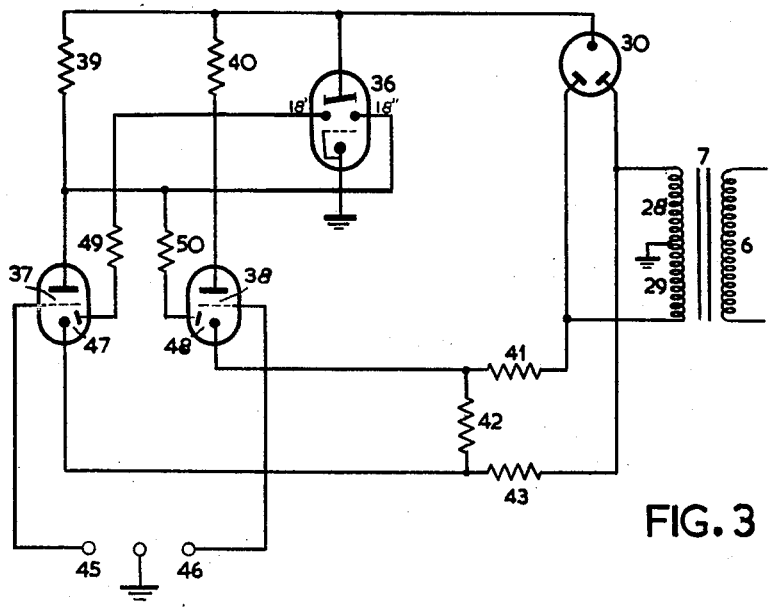
Fig. 3 is a schematic diagram of still another embodiment of the circuit arrangement of the present invention.

It may therefore be advisable, to use, in a circuit-arrangement as shown in Fig. 3, an indicator tube 36, comprising two deflection electrodes 18′ and 18″ which control, substantially independently of one another, for example two electron beams or the boundaries of a broad electron beam. The cathode of indicator tube 36 is grounded and its anode, similarly to Fig. 2, is supplied with positive half waves of double frequency from the transformer windings 28 and 29 through a full wave rectifier tube 30, and as the case may be, a small charging capacitor (not shown in the figure).

The anodes of amplifier tubes 37 and 38 are connected to the deflection electrodes 18′ and 18″ and, through separate work resistors 39, 40, together with the anode of the indicator tube 36 are connected to the supply 28, 29, 30. The cathodes of amplifier tubes 37 and 38 are connected to the ends of resistor 42 of a series-combination of resistors 41, 42 and 43, which series-combination acts as a voltage divider and is connected to the ends of the windings 28, 29. The voltage divider 41, 42, 43 is so constructed that substantially equal voltages are set up at it in phase opposition to ground.

The measuring values are supplied to the grids of tubes 37 and 38 through input terminals 45 and 46, respectively. Due to the cathode alternating voltages from the voltage divider 41, 42, 43 the measuring values are indicated alternately, but visually simultaneously, through control by means of either deflection electrode (18′, 18″. Each time the amplifier tube 37 or 38 is cut off the associated deflection electrode 18′ or 18″ has the same potential as the anode of the indicator tube 36. The difference between these values and the setting determined by the measuring value is sometimes very considerable, so that the fixed value thus obtained is unsuitable as reference value or comparison value.

The reference value can be set to any desired value with the use of two diodes 47 and 48, the cathodes of which are directly connected to the cathodes of the amplifier tubes 37, 38 and the anodes of which are connected through resistors 49 and 50, respectively, to the anode of each of the other amplifier tubes 38 and 37, respectively. If the cut-off voltage (cathode auxiliary voltage) on the cathode of one tube (for example, tube 37), is approximately of the same order as the voltage set up, in the case of current flow, on the anode of the other tube so that a current, which is much lower than the tube current, flows through the resistor (for example, resistor 49) associated with the anode concerned (for example, of tube 38), it is found that the control in accordance with the measuring value is not practically impaired and that during the cut-off period the voltage of the anode of the blocked tube is limited, since the current flowing through the anode resistors 39, 40, diode resistors 50, 49 and diodes 48, 47, respectively, to voltage divider 41, 42, 43 is particularly determined by the value of the resistors 50, 49, respectively.

If the cathode voltage considerably exceeds the maximum positive voltage set up at the anode concerned, it is even posssible for the indicated fixed value to lie in the range of variation determined by the measuring values, for example at the middle.

This fixed value depends neither upon a comparison voltage nor particularly upon the supply voltage, but only upon the ratio between the resistors 39, 50 and 40, 49, respectively, and the ratio between the cathode and anode voltages. These ratios are determined by the voltage divider 41, 42, 43 and, in a supply circuit as shown in Figs. 1 or 2, by the transformation conditions of the transformer windings, respectively, and upon the properties of the indicator tube 36, any variations of the alternating voltage amplitude having no effect. Although the amplification properties of tubes 37 and 38 are sufficiently constant, comparsion of the measuring value with a normal value is consequently possible.

If the circuit-arrangement shown in Fig. 3 comprises a low ohmic resistance cathode circuit, the aforesaid fixed-value indication independent of the measuring value is obtainable. In the case of an appreciable negative feedback resistance, however, the voltage set up therein, reacts on the fixed-value indication which may sometimes involve control of the "fixed value" in opposite sense, for example increased indication differences. In this case, an exact fixed value is, in general, not obtained.

This disadvantage is avoided by separating the cathodes of the diode (47, 48) and amplifier tube (37, 38) associated as shown in Fig. 3 and conecting the feedback resistor only in the cathode lead of the amplifier tube 37 or 38, respectively. In this case, the diode cathodes are connected to a point having a potential independent of the measuring voltage, for example to ground or to a point of constant direct voltage, or to two points at which alternating voltages are set up in phase opposition to ground, for example the ends of windings 28 and 29.

Figure 4:
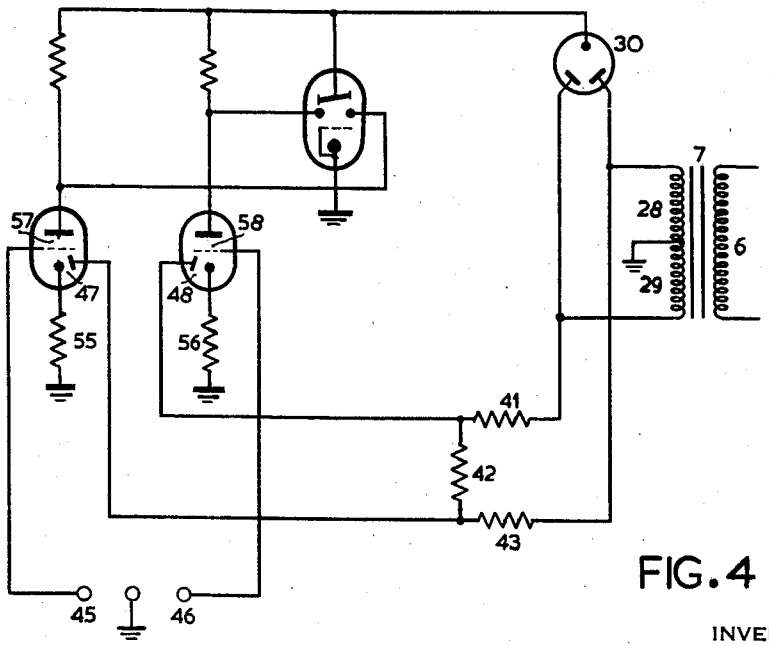
Fig. 4 is a modification of the embodiment of Fig. 3.

Fig. 4 shows a circuit-arrangement corresponding to that shown in Fig. 3 and comprising grounded cathode resistors 55, 56. In this case, again, the anode voltage is supplied by a full-wave rectifier 28, 29, 30, which may even be adequately filtered so as to produce substantially direct voltage.

The switching voltage for alternately cutting off either of the tubes 57 and 58 is taken by means of a voltage divider 41, 42, 43 from windings 28, 29 of the transformer 7 and introduced through the anodes of diodes 47, 48 into the cathode circuits of tubes 57, 58, respectively. Consequently, these cathodes alternately become positive, so that the diodes 47 and 48 are, respectively, alternately cut off.

Figure 5:
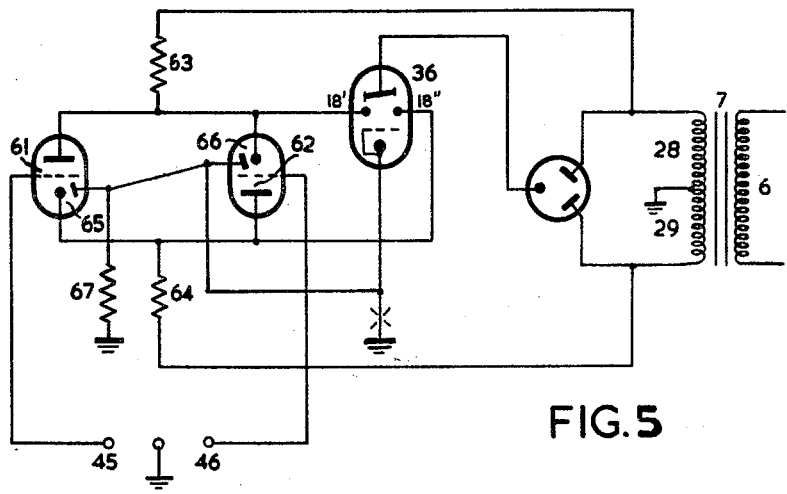
Fig. 5 is a schematic diagram of another embodiment of the circuit arrangement of the present invention.

Fig. 5 shows another simplified embodiment of the invention, the effect of which resembles that of the circuit-arrangement shown in Fig. 3. The anode of amplifier tube 61 and the cathode of amplifier tube 62, and the cathode of amplifier tube 61 and the anode of amplifier tube 62 are connected together and to deflection electrodes 18', 18", respectively, of the indicator tube 36 and are connected through work resistors 63, 64 to the ends of a centrally grounded push-pull winding 28, 29 of transformer 7. Voltages of measuring value are applied through input terminals 45, 46 relatively to ground to the grids of the amplifier tubes 61 and 62.

The cathodes of two diodes 65, 66 are associated with the cathodes of tubes 61, 62; the diode anodes are connected together and grounded. An alternating voltage which, similarly to the circuit-arrangements shown in Figs. 3 and 4, may be obtained by full-wave rectification and consists of positive half waves of double the frequency, is applied to the anode of the indicator tube 36. The cathode of the indicator tube and the junction point of the transformer windings 28, 29 are also grounded.

The cathodes of the amplifier tubes 61, 62, which are each time conductive, are supplied through work resistors 64, 63, respectively, with a negative voltage (half waves) rendering the diodes 65 and 66 conductive, with the result that the cathode concerned is grounded and control of the inputs 45 and 46 is possible in a simple manner. Due to the arrangement of the diodes 65 and 66 the indications are also adequately separated, since the anode of the blocked tube and consequently the deflection electrode connected thereto are also grounded.

The ground connection of the diode anodes may alternatively comprise a resistor 67, as the case may be with a shunting capacitor or an auxiliary battery, which permit a negative feedback or shift of the performance point. By taking steps for varying the angle of current flow, referred to hereinbefore, it is possible to indicate a fixed mark set to a given value.

It may be advantageous not to connect the cathode of the indicator tube 36 directly to ground, but to connect it to the anodes of diodes 65 and 66 and ground it through a resistor. This reduces the degree to which the electron beam, which is not controlled during a half cycle and may, for axample, serve as a fixed-value indication, is frequently caused to follow the controlled electron beam.

Figure 6:
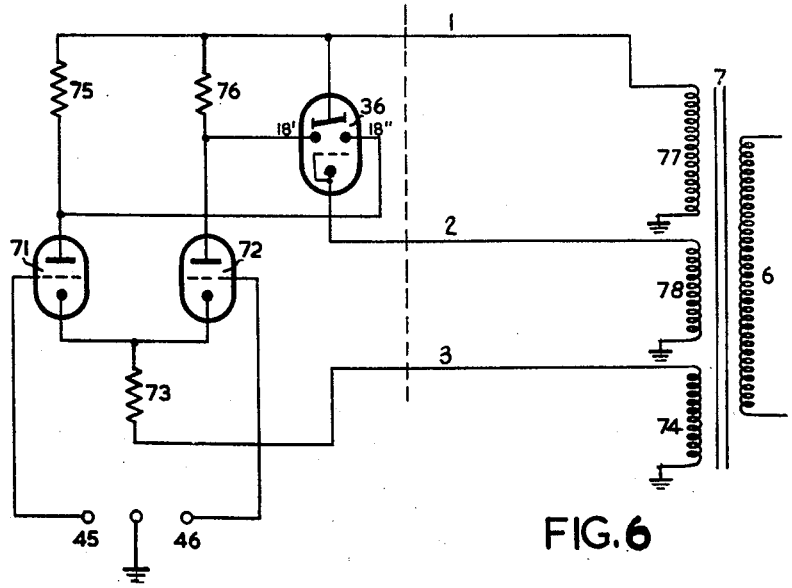
Fig. 6 is a schematic diagram of still another embodiment of the circuit arrangement of the present invention.

Fig. 6 shows a circuit arrangement which permits the difference of two measuring values to be indicated or measured in a simple manner. The input terminals 45 and 46 are connected to the grids of two amplifier tubes 71 and 72 respectively, the cathodes of which are connected together and, through a common cathode resistor 73, to a cathode auxiliary voltage supply, i.e. winding 74 of the supply transformer 7. The anodes of tubes 71, 72, which are directly connected to deflection electrodes 18' and 18", respectively, of indicator tube 36, are supplied through work resistors 75 and 76, respectively, similarly to the anode of indicator tube 36, from a source of alternating voltage. In Fig. 6, said source of alternating voltage utilizes winding 77 of the supply transformer 7. The cathode of indicator tube 36 is connected to a transformer winding 78, the other ends of the transformer windings 74, 77, 78 being grounded.

In this circuit arrangement, both measuring values are simultaneously made operative at deflection electrodes 18' and 18", respectively, and indicated.

If the construction of the indicator tube 36 is such that, for example, two electron beams are laterally deflected under the action of the deflection electrodes and the lateral displacement is converted into a vertical displacement by using a triangular diaphragm, it can be distinctly ascertained whether the two values are equal or are in a given relationship determined by the amplification properties of tubes 71 and 72 and the value of work resistors 75 and 76.

The resistor 73 in the common cathode lead permits negative feedback by which a component common to both measuring values is largely suppressed and only the difference of the measuring values is indicated. This is particularly important if the common component is comparatively large and/or variable through a comparatively wide range, whereas the difference to be indicated is only small.

As has been stated above, variation of the angle of current flow permits, for example, a fixed-value indication to be obtained by introducing a direct voltage into the supply circuits. Since the tubes are controlled simultaneously, at least a portion of the non-controlled half cycle is available therefor.

Figure 7:
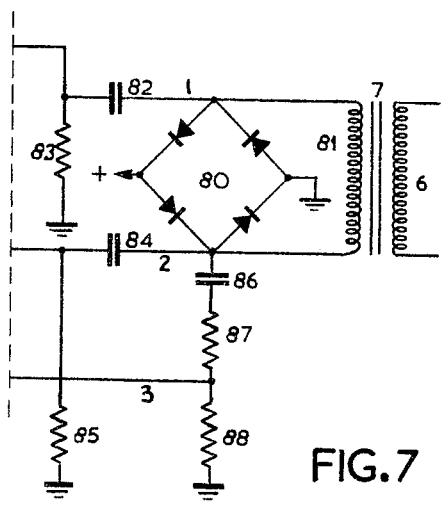
Fig. 7 is a modification of a portion of the embodiment of Fig. 6.

Similarly to the aforesaid circuit-arrangements the supply may be effected from a small number of windings, if desired by means of voltage dividers. The supply from a bridge rectifier (Graetz rectifier) 80 as shown in Fig. 7, is of particular practical importance. Fig. 7 shows only the supply portion to the right of the broken line in Fig. 6.

In this instance, winding 81 of the supply transformer 7 carries half the positive direct voltage supplied by the rectifier 80 to the positive terminal of the direct voltage output, the negative terminal of the direct voltage output being grounded conductively. With respect to alternating voltage the center of the winding 81 has ground potential, so that the ends of the transformer winding 81, which are connected to the alternating voltage input of rectifier 80, supply symmetrical alternating voltages in phase opposition relatively to ground. These voltages can be taken off free from direct voltage by means of coupling members consisting of the series-combination of blocking capacitors 82, 84 connected to the alternating voltage input of rectifier 80 and grounded resistors 83 and 85, respectively, the value of each individual element preferably being so chosen that the full alternating voltage occurs without phase displacement on the resistors 83 and 85, respectively.

Voltage division is possible in a simple manner by splitting up the resistor as shown with reference to the coupling member 86, 87, 88 provided for the cathode voltage. At least one voltage divider may, if desired, have high ohmic resistance, so that the grounded portion serves as a preliminary resistor, for example as a negative feedback resistor for the cathodes of tubes 71 and 72.

In general, provision should be made that all the coupling members bring about a negligible or the same phase displacement of the supply voltages referred to, in order that the voltages across the indicator tube 36 be no longer proportional to one another at any one instant, so that the indication is no longer independent of the alternating voltage variation but is faulty, for example blurred at its edges.

If the cathode of indicator tube 36 and the cathodes of amplifier tubes 71, 72 are supplied from the same coupling member, for example 86, 87, 88 (in which case the coupling member 84, 85 is dispensed with) and also the anodes are connected to the same coupling member 82, 83, any desired phase displacement relative to the voltage on winding 81 is permissible between both coupling members. In this case, consequently, the input voltage has to be supplied relatively to a point of the cathode circuit, and not with respect to ground, since the alternating potential of the ground point is determined by the center of winding 81 and independent of any phase displacement by the coupling members, so that difficulties may arise.

If a coupling member transmits substantially the full alternating voltage, so that its capacitive reactance is low relative to its ohmic resistance, its time constant is also considerable. Consequently, the direct current flowing through the ohmic resistor and produced by rectification of the tubes 36, 71, 72 brings about a voltage drop which is stored by the blocking capacitor and is consequently added to the alternating supply voltage, since it is a direct voltage part dependent upon the input. Hence, the coupling member should have a low ohmic value. If, however, similarly to coupling member 86, 87, 88, the ohmic resistor is divided, a reduced influence of the storage effect of capacitor 86 through the resistor 87 acting as a preliminary resistor is possible, even if it has a high ohmic value.

If the input voltage is not connected to the same point of fixed potential, for example ground, as the rectifier, but may be chosen at will, the blocking capacitors 82, 84, 86 may be replaced by direct connections and particularly the direct current-carrying resistors 83 and 85 can be dispensed with. In this case, the indicating circuit comprising tubes 36, 71 and 72 carries half the direct voltage of the rectifier 80 relatively to ground.

If a direct voltage component is permissible in the anode supply, it may be directly connected to the alternating voltage input of the bridge rectifier, and the coupling member 82, 83 can be dispensed with. The member 84, 85 is also superfluous if the cathode of the indicator tube is connected to the cathode supply conductor from the voltage divider 87, 88, or if it is directly grounded (in this case the cathode of the indicator tube is connected to the center of winding 81 with respect to alternating voltage). In this case, the coupling member 86, 87, 88, as the case may be with voltage division, is still required, since the cathode circuit should be maintained free from direct voltage, in order that the input voltages may be supplied relative to ground.

Figure 8:
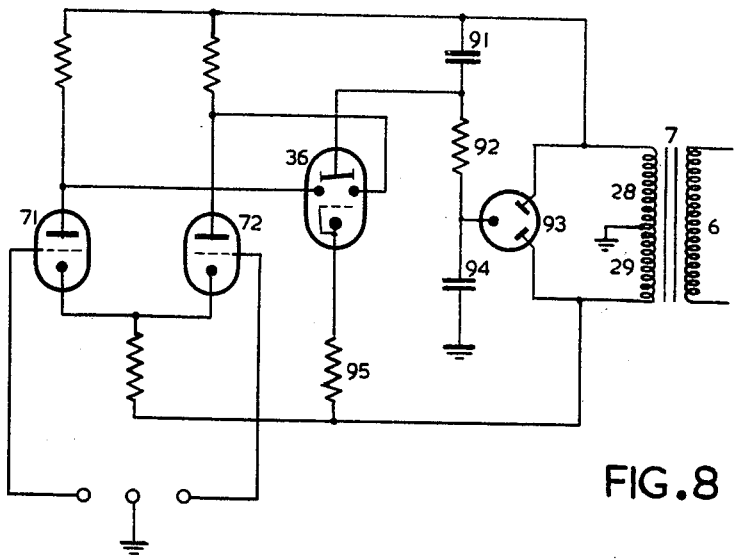
Fig. 8 is a modification of the embodiment of Fig. 6.

Fig. 8 shows a circuit- arrangement corresponding to that shown in Fig. 6, in which the tubes 71 and 72 are supplied from the push-pull winding 28, 29 of transformer 7 (vide Fig. 6). The anode of the indicator tube 36 is brought, through a capacitor 91, to the same alternating voltage potential as the anodes of amplifier tubes 71, 72 and receives, for increasing the angle of current flow and/or the intensity, through an alternating voltage blocking member, the resistor 92, a direct voltage from the rectifier constituted by a full-wave rectifier tube 93, and, as the case may be, a charging capacitor 94. In the case of Fig. 8, said capacitor 94 may be comparatively large since primarily only direct voltage has to be supplied through the resistor 92 and in order to prevent disturbing phase displacement of the alternating voltage set up at the junction point of resistor 92 and the capacitor 94.

A resistor 95 should be provided between the cathode of indicator tube 36 and the winding 29 in order that the voltage across the indicator tube 36 may be reduced and the performance point may be stabilized by negative feedback.

Figure 9:
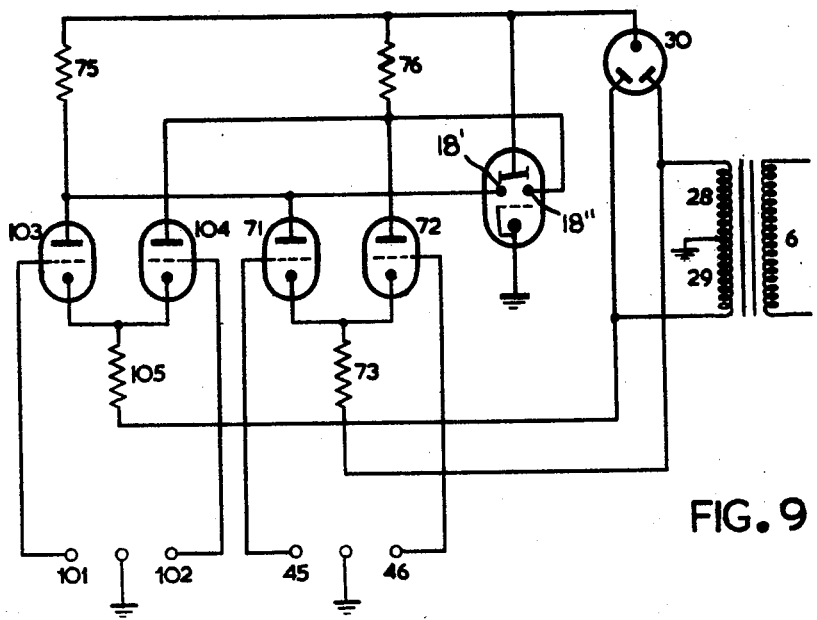
Fig. 9 is a schematic diagram of another embodiment of the circuit arrangement of the present invention.

Fig. 9 shows a circuit-arrangement in which, as compared with Fig. 6, a second pair of measuring values, particularly in its difference, can be indicated independently of the first pair of measuring values supplied to the terminals 45 and 46.

The four input terminals 101, 102 and 45, 46 are connected to the grids of amplifier tubes 103, 104, and 71, 72, respectively. The cathodes of tubes 103, 104 and 71, 72 are connected together and, through common cathode resistors 105 and 73, respectively, alternating voltages in phase opposition taken from windings 28 and 29, if desired through a voltage divider, are introduced. The anodes of tubes 103, 71 and 104, 72, respectively, are connected to deflection electrodes 18', 18" of indicator tube 36 and are connected through work resistors 75 and 76, respectively, to a voltage supply delivering positive half waves of double the frequency. The voltage supply may comprise, for example the cathode of a full wave rectifier tube 30, the anodes of which are connected to the ends of windings 28 and 29 which supply the cathode auxiliary voltages. The junction point of the windings 28 and 29 is grounded.

The cathode auxiliary voltage supplied through resistors 105, 73 alternately operates pairs of tubes 103, 104 and 71, 72, respectively, and indicates, through the tube 36, the measuring values supplied to their inputs 101, 102 and 45, 46, respectively. If one pair of tubes is operative, the other pair is completely cut off, so that no reaction occurs between the indications.

As has been stated, indication of a fixed value is possible by connecting direct voltages in series with one or more of the alternating voltages. The resistors 73 and 105 respectively provide a negative feedback for the value common to the associated input voltages. If this is not required, said resistors may be reduced or even omitted.

Figure 10:
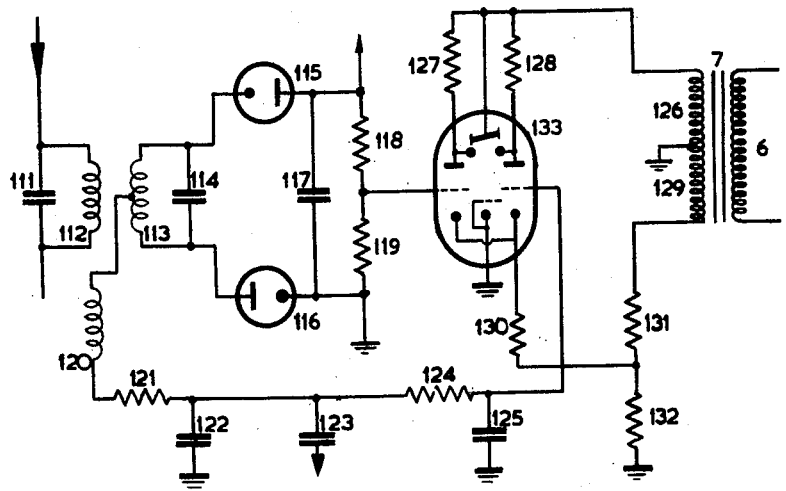
Fig. 10 is a schematic diagram of a tuning indication circuit utilizing the circuit arrangement of the present invention.

Fig. 10 shows a circuit-arrangement for tuning indication in receiving apparatus for frequency-modulated oscillations with the use of a non-symmetrical ratio detector supplying two voltages the difference of which is a measure of detuning (mis-tuning). In this case, in accordance with the invention, the indicator tube and the measuring value amplifier tubes are supplied with alternating voltage.

An intermediate frequency current comprising the frequency modulation is supplied, for example by the last amplifier tube of the intermediate frequency amplifier, to the oscillatory circuit 111, 112, the oscillations being transmitted to the secondary circuit 113, 114 through a preferably loose negative feedback. Two diodes 115, 116 are connected with opposite polarity to the external terminals of said secondary oscillator circuit, the cathode of the diode 116 remote from the circuit 113, 114 being grounded. A comparatively large capacitor 117 and two load resistors 118, 119 in series are connected in parallel combination between the anode of the diode 115 and ground. Alternatively, a voltage for independent amplification control may be taken from the diode 115, as indicated by a double-headed arrow.

To the middle of the oscillatory circuit inductance 113 is connected a tertiary coil 120 which is preferably tightly coupled with the primary inductance 112 and from the other end of which the demodulated low frequency voltage can be taken through an RC equalization circuit 121, 122 and a blocking capacitor 123. The parts so far described represent a known ratio detector.

It is to be noted that, as an alternative, a symmetrical ratio detector or other frequency-modulation circuit-arrangement may be used, which supplies at least one slowly variable voltage depending on detuning.

After further separation of the low frequency voltages on the capacitor 122 through an RC-smoothing circuit 124, 125, a direct voltage is obtained, the difference of which relative to the voltage set up at the junction of the resistances 118 and 119 is a measure of detuning of the apparatus with respect to the middle frequency of the input filter 111 to 114.

Said voltages are applied to the grids of two amplifying triodes which, together with the indicating system, are housed in one envelope and constitute a tuning indicator tube 133.

The anode of the luminous screen is connected to a winding 126 of the supply transformer 7, to which are also connected, through work resistors 127, 128, the anodes of the amplifying systems connected to the deflection electrodes of the indicating system. The cathode of the indicating system is grounded. The cathodes of the amplifying systems are connected together and through a resistor 130, to a voltage divider, comprising resistors 131 and 132, which is connected between the winding 129 and ground. The winding 129 of transformer 7 supplies an alternating voltage of opposite phase with respect to winding 126. The ends of the windings 126, 129 not connected to the indicator tube circuit are grounded.

The indicating system is consequently supplied from winding 126. The cathode auxiliary voltage for the amplifying systems is taken from the voltage divider 131, 132. The resistor 130 provides a strong negative feedback for the regulating voltage part supplied to both grids in common, and the difference between the grid voltages, that is to say the detuning voltage, is indicated very accurately. The detuning voltage to be indicated is only a few volts and has superposed on it a direct voltage (regulating voltage part) which depends on the input amplitude and is not necessary for tuning indication. Said direct voltage may be 30 volts or higher. Since the regulating voltage part is supplied to both grids simultaneously, the cathode resistor 130 brings about a strong negative feed-back for said direct voltage, whereas the detuning voltage, which is superposed on both grids with opposite polarities, is neutralized with regard to its effect on the cathode circuit, so that it influences the deflection electrodes of the indicator tube without negative feedback and with full amplification.

Particularly, if the current passing through the indicating system is of the same order or smaller than the current through the amplifying system, the cathode of the indicating system may be connected to the cathode of the amplifying system. This is often desired since, in a combination tube of this type, only a limited number of contact pins is available for establishing the connections. Also in this circuit arrangement, as has been stated hereinbefore, a fixed value can be indicated additionally as a comparison mark by introducing a direct voltage obtained, for example, through an RC circuit.

In order to secure a satisfactory negative feed back it is necessary for the amplitude of the auxiliary voltage supplied by a voltage divider 131, 132 for the amplifier cathodes to be larger, preferably four times larger, than the maximum expected value of the regulating voltage. If the negative feedback through the resistor 130 is too feeble, overcontrol occurs at least at one boundary of the control voltage range, hence the desired indication is impaired. If, in contradistinction thereto, the negative feedback, and consequently the auxiliary voltage, is very considerable, the difference indication (detuning) can be made substantially independent of the input amplitude. The resistor 130 and the auxiliary voltage taken from the voltage divider 131, 132 are preferably so chosen that, in the whole range of the regulating voltage, the performance point of the amplifier tubes varies only to such a degree as to not impair the indication of the detuning voltage, while obtaining an indication of the regulating voltage. In this manner is achieved the result that an indication of the intensity of the incoming transmitter can be read off the indicator tube 133.

By means of a high ohmic resistance voltage divider 131, 132 it is possible to operate the parallel-combination of the two partial resistors 131, 132 as a negative feedback resistor instead of as an additional resistor 130.

The cathode of the indicating system may be connected to the cathodes of the amplifying systems instead of being grounded. In this case, the resistors 130, 131 and 132 have to be proportioned accordingly, and preferably the cathode auxiliary voltage, which is supplied by the voltage divider 131, 132, has to be increased.

While the invention has been described by means of specific examples and in specific embodiments, I do not wish to be limited thereto, for obvious modifications will occur to those skilled in the art without departing from the spirit and scope of the invention.

What is claimed is:

1. A circuit arrangement for indicating electrical values comprising an electron discharge indicating device having means for producing an electron beam, means for controlling the deflection of said beam and means for indicating the deflection of said beam, a pair of amplifier tubes each having an anode, a cathode and a control grid, said deflection controlling means being connected to the anodes of said tubes, means for controlling the amplification of said tubes in accordance with said electrical values whereby the said values are indicated by said deflection indicating means, said last-mentioned means comprising means for supplying a voltage varying as said electrical values to said control grids, a plurality of sources of alternating voltage, means for applying voltages from selected ones of said sources of alternating voltage to the cathodes of said tubes thereby to render the said tubes selectively conductive, said last-mentioned voltages having a substantially the same frequency and substantially opposite phases, and means for applying voltages from selected ones of said sources of alternating voltage to said deflection indicating means and to the said anodes comprising means for full-wave rectifying the voltage from said sources of alternating voltage thereby producing positive half-waves of double the frequency of the voltages applied to the said cathodes said last-mentioned voltages being of substantially the same waveshape and being of predetermined fixed relative phase relation, the frequencies of the said last-mentioned voltages being high relative to said voltage varying as said electrical values, and means for applying the output of said rectifying means to the said anodes and to said deflection indicating means, said output applying means comprising a resistor connected between the said anodes and the output of the said rectifying means.

2. A circuit arrangement for indicating electrical values comprising an electron discharge indicating device having means for producing an electron beam, means for controlling the deflection of said beam comprising a pair of deflection electrodes and means for indicating the deflection of said beam, a pair of amplifier tubes each having an anode, a cathode and a control grid, said deflection electrodes being connected to the anodes of said tubes, means for controlling the amplification of said tubes in accordance with said electrical values whereby the said values are indicated by said deflection indicating means, said last-mentioned means comprising means for supplying a voltage varying as said electrical values to said controls grids, a source of alternating voltage, means for applying voltages from said source of alternating voltage to the cathodes of said tubes thereby to render the said tubes selectively conductive, said last-mentioned voltages having substantially the same frequency and substantially opposite phases, means for applying voltages from said source of alternating voltage to said deflection indicating means and to the anodes of said tubes comprising means for full-wave rectifying the voltage from said sources of alternating voltage thereby producing positive half-waves of double the frequency of the voltages applied to the said cathodes, said last-mentioned voltages being of substantially the same wave-shape and being of predetermined fixed relative phase relation, the frequencies of the said last-mentioned voltages being high relative to said voltage varying as said electrical values, and means for applying the output of said rectifying means to the said anodes and to said deflection indicating means, said output applying means comprising a resistor connected between each of said anodes and the output of said rectifying means, a pair of diodes each having an anode and a cathode, the cathode of each of said diodes being connected to the cathode of each of said tubes, and means for connecting the anode of each of said diodes to the anode of the other of said tubes, said last-mentioned means comprising a resistor connected between the anode of each of said diodes and the anode of the other of said tubes.

3. A circuit arrangement as claimed in claim 2, further comprising voltage dividing means interposed in said means for applying voltages from said source to the cathodes of said tubes.

4. A circuit arrangement for indicating electrical values comprising an electron discharge indicating device having means for producing an electron beam, means for controlling the deflection of said beam comprising a pair of deflection electrodes and means for indicating the deflection of said beam, a pair of amplifier tubes each having an anode, a cathode and a control grid, said deflection electrodes being connected to the anodes of said tubes, means for controlling the amplification of said tubes in accordance with said electrical values whereby the said values are indicated by said deflection indicating means, said last-mentioned means comprising means for supplying a voltage varying as said electrical values to said control grids, means for connecting the cathode of each of said tubes to a point at ground potential comprising a resistor connected between each said cathode and said point, a source of alternating voltage having a pair of end terminals and an intermediate terminal connected to a point at ground potential, the voltage between one end terminal and said intermediate terminal being of substantially opposite phase from the voltage between the other end terminal and said intermediate terminal, a pair of diodes each having an anode and a cathode, the cathode of each of said diodes being connected to the cathode of each of said tubes, means for applying voltages from said source of alternating voltage to the anodes of said diodes, and means for applying voltages from said source of alternating voltage to said deflection indicating means and to the anodes of said tubes comprising means for full-wave rectifying the voltage from said source of alternating voltage thereby producing positive half-waves of double the frequency of the voltage applied to the anodes of said diodes, said last-mentioned voltages being of substantially the same wave-shape and being of predetermined fixed relative phase relation, the frequencies of the said last-mentioned voltages being high relative to said voltage varying as said electrical values, and means for applying the output of said rectifying means to the said anodes and to said deflection indicating means, said output applying means comprising a resistor connected between each of the anodes of said tubes and the output of said rectifying means.

5. A circuit arrangement for indicating electrical values comprising an electron discharge indicating device having means for producing an electron beam, means for controlling the deflection of said beam comprising a pair of deflection electrodes and means for indicating the deflection of said beam, said beam producing means being connected to a point at ground potential, a pair of amplifier tubes each having an anode, a cathode and a control grid, one of said deflection electrodes being connected to the anode of one of said tubes and the cathode of the other of said tubes and the other of said deflection electrodes being connected to the cathode of the one of said tubes and the anode of the other of said tubes, means for controlling the amplification of said tubes in accordance with said electrical values whereby the said values are indicated by said deflection indicating means, said last-mentioned means comprising means for supplying a voltage varying as said electrical values to said control grids, a source of alternating voltage having a pair of end terminals and an intermediate terminal connected to a point at ground potential, the voltage between one end terminal and said intermediate terminal being of substantially opposite phase from the voltage between the other end terminal and said intermediate terminal, means for applying voltages from said source of alternating voltage to said deflection electrodes comprising a resistor connected between one of said end terminals and the connection between the anode of one of said tubes and the cathode of the other of said tubes and a second resistor connected between the other of said end terminals and the connection between the cathode of the one of said tubes and the anode of the other of said tubes, and means for applying voltages from said source of alternating voltage to said deflection indicating means comprising means for full-wave rectifying the voltage from said source thereby producing positive half-waves of double the frequency of the voltage applied to said deflection electrodes, said last-mentioned voltages being of substantially the same waveshape and being of predetermined fixed relative phase relation, the frequencies of the said last-mentioned voltages being high relative to said voltage varying as said electrical values, and means for applying the output of said rectifying means to said deflection indicating means.

6. A circuit arrangement as claimed in claim 5, further comprising a pair of diodes each having an anode and a cathode, the cathode of each of said diodes being connected to the cathode of each of said tubes, and means for connecting the anodes of said diodes to each other and to a point at ground potential.

7. A circuit arrangement as claimed in claim 5, further comprising a pair of diodes each having an anode and a cathode, means for connecting the anodes of said diodes to each other, a conductive connection between said last-mentioned means and said beam producing means, and means for connecting a point common to said conductive connection and said beam producing means to a point at ground potential comprising a resistor connected between said common point and said point at ground potential.

8. A circuit arrangement for indicating electrical values comprising an electron discharge indicating device having means for producing an electron beam, means for controlling the deflection of said beam comprising a pair of deflection electrodes and means for indicating the deflection of said beam, a pair of amplifier tubes each having an anode, a cathode and a control grid, said deflection electrodes being connected to the anodes of said tubes, the cathodes of said tubes being connected to each other, means for controlling the amplification of said tubes in accordance with said electrical values whereby the said values are indicated by said deflection indicating means, said last-mentioned means comprising means for supplying a voltage varying as said electrical values to said control grids, a plurality of sources of alternating voltage, means for applying voltages from one of said sources of alternating voltage to the cathodes of said tubes thereby to render the said tubes selectively conductive, and means for applying voltages from one of said sources of alternating voltage to said deflection indicating means and to the anodes of said tubes comprising means for applying said last-mentioned voltage to said deflection indicating means and a resistor connected between each of the said anodes and the source of said last-mentioned voltages, said last-mentioned voltage having substantially the same frequency as the voltages applied to the said cathodes and being of substantially the same waveshape and of predetermined fixed relative phase relation, the frequencies of the said last-mentioned voltages being high relative to said voltage varying as said electrical values.

9. A circuit arrangement as claimed in claim 8, further comprising a resistor connected between the common cathode connection and one of said sources of alternating voltage whereby the difference between the electrical values controlling the amplification of said tubes is indicated by said deflection indicating means.

10. A circuit arrangement for indicating electrical values comprising an electron discharge indicating device having means for producing an electron beam, means for controlling the deflection of said beam comprising a pair of deflection electrodes and means for indicating the deflection of said beam, a pair of amplifier tubes each having an anode, a cathode and a control grid, said deflection electrodes being connected to the anodes of said tubes, the cathodes of said tubes being connected to each other, means for controlling the amplification of said tubes in accordance with said electrical values whereby the said values are indicated by said deflection indicating means, said last-mentioned means comprising means for supplying a voltage varying as said electrical values to said control grids, a source of alternating voltage, bridge rectifying means having an output terminal connected to a point at ground potential and a pair of input terminals coupled across said source of alternating voltage, and means for applying voltages from one of said input terminals to the anodes of said tubes and to said deflection indicating means comprising means for applying said last-mentioned voltages to said deflection indicating means and a resistor connected between each of the said anodes and the source of said last-mentioned voltage, said last-mentioned voltages being adapted for superposition of a direct voltage thereon and being of substantially the same waveshape and of predetermined fixed relative phase relation, the frequencies of the said last-mentioned voltages being high relative to said voltage varying as said electrical values.

11. A circuit arrangement as claimed in claim 10, further comprising means having a substantially low resistance for applying voltage from the other of said input terminals to said beam producing means.

12. A circuit arrangement as claimed in claim 10, further comprising coupling means for producing an alternating voltage having no direct voltage component connected between one of said input terminals and a point at ground potential, said coupling means comprising a capacitor and a resistor in series circuit connection with said capacitor.

13. A circuit arrangement as claimed in claim 12, further comprising second coupling means connected in said means for applying voltage from one of said input terminals to the anodes of said tubes and to said deflection indicating means, said second coupling means being conductive for alternating voltages and having a substantially low resistance.

14. A circuit arrangement as claimed in claim 10, further comprising coupling means adapted to provide substantial voltage division connected between one of said input terminals and a point at ground potential and means for applying voltages produced across said coupling means to the cathodes of said tubes and to said beam producing means.

15. A circuit arrangement as claimed in claim 14, wherein said coupling means has a substantially low resistance of such value that the portion thereof connected to said point at ground potential provides a substantially negative feedback.

16. A circuit arrangement for indicating electrical values comprising an electron discharge indicating device having means for producing an electron beam, means for controlling the deflection of said beam comprising a pair of deflection electrodes and means for indicating the deflection of said beam, a pair of amplifier tubes each having an anode, a cathode and a control grid, said deflection electrodes being connected to the anodes of said tubes, the cathodes of said tubes being connected to each other, means for controlling the amplification of said tubes in accordance with said electrical values whereby the said values are indicated by said deflection indicating means, said last-mentioned means comprising means for supplying a voltage varying as said electrical values to said control grids, a source of alternating voltage, means for applying voltages from said source of alternating voltage to the anodes of said tubes comprising a resistor connected between each of the said anodes and said source, means for applying voltages from said source to said deflection indicating means comprising a blocking capacitor coupled between said deflection indicating means and said source of alternating voltage, and means for applying additional voltages from said source of alternating voltage to said deflection indicating means comprising means for full-wave rectifying the voltage from said source of alternating voltage and a resistor connected between said rectifying means and said deflection indicating means, said last-mentioned voltages being of substantially the same waveshape and of predetermined fixed relative phase relation, the frequencies of the said last-mentioned voltages being high relative to said voltage varying as said electrical values.

17. A circuit arrangement for indicating electrical values comprising an electron discharge indicating device having means for producing an electron beam, means for controlling the deflection of said beam comprising a pair of deflection electrodes and means for indicating the deflection of said beam, two pairs of amplifier tubes each having an anode, a cathode and a control grid, means for connecting the anode of one tube of one of said pairs of tubes and the anode of one tube of the other of said pairs of tubes to each other and to one of said deflection electrodes, means for connecting the anode of the other tube of said one of said pairs of tubes and the anode of the other tube of said other of said pairs of tubes to each other and to the other of said deflection electrodes, the cathode of one tube of each of said pairs of tubes being connected to the cathode of the other tube of each of said pairs of tubes, means for controlling the amplification of said tubes in accordance with said electrical values whereby the said values are indicated by said deflection indicating means, said last-mentioned means comprising means for supplying a voltage varying as said electrical values to said control grids, a source of alternating voltage having a pair of end terminals and an intermediate terminal connected to a point at ground potential, the voltage between one end terminal and said intermediate terminal being of substantially opposite phase from the voltage between the other end terminal and said intermediate terminal, means for applying voltages from said source of alternating voltage to the cathodes of said tubes thereby to render the said tubes selectively conductive, and means for applying voltages from said source of alternating voltage to said deflection indicating means and to the anodes of said tubes comprising means for full-wave rectifying the voltage from said source of alternating voltage thereby producing positive half-waves of double the frequency of the voltage applied to the said cathodes, said last-mentioned voltages being of substantially the same waveshape and of predetermined fixed relative phase relation, the frequencies of the said last-mentioned voltages being high relative to said voltage varying as said electrical values, and means for applying the output of said rectifying means to the said anodes and to said deflection indicating means, said output applying means comprising a resistor connected between each of said anode connecting means and the output of said rectifying means.

18. A circuit arrangement as claimed in claim 17, wherein each of said amplifier tubes further comprises a control grid, said electrical values being applied between each said control grid and a point at ground potential.

19. A circuit arrangement for frequency modulation apparatus tuning indication comprising frequency modulation discriminating means for receiving input oscillations and for producing two voltages therefrom having a difference therebetween which varies with the condition of detuning of said apparatus, an electron discharge indicating device having means for producing an electron beam, means for controlling the deflection of said beam and means for indicating the deflection of said beam, a pair of amplifier tubes each having an anode, a cathode and a control grid, the anodes of said tubes being connected to said deflection controlling means, the cathodes of said tubes being connected to each other, means for applying said two voltages to the control grids of said tubes whereby the difference therebetween is indicated by said deflection indicating means, a source of alternating voltage, means for applying voltages from said source of alternating voltage to said deflection indicating means, means for applying voltages from said source of alternating voltage to the said anodes comprising a resistor connected between each of the said anodes and said source of alternating voltage, means for deriving an auxiliary voltage from said source of alternating voltage, and means for applying said auxiliary voltage to the said cathodes, the voltage applied to the said cathodes being of substantially opposite phase from the voltage applied to the said anodes.

20. A circuit arrangement as claimed in claim 19, further comprising a negative feedback resistor connected between the said cathodes and said auxiliary voltage deriving means.

21. A circuit arrangement as claimed in claim 19, wherein said two voltages have equal variable magnitudes, said auxiliary voltage deriving means comprises a potentiometer arrangement connected to said source of alternating voltage, and said auxiliary voltage has a magnitude which is substantially four times greater than the maximum magnitude of the said two voltages.

22. A circuit arrangement as claimed in claim 19, wherein said auxiliary voltage deriving means comprises a potentiometer arrangement having component portions connected to said source, and further comprising a negative feedback resistor connected between the said cathodes and said potentiometer, said component potentiometer portions and said negative feedback resistor having resistance values such that the variation of the performance point of said tubes is limited to a predetermined range thereby resulting in an accurate indication of the difference between the said two voltages and an indication of the magnitude of the said two voltages.

23. A circuit arrangement for indicating electrical values comprising an electron discharge indicating device having means for producing an electron beam, means for controlling the deflection of said beam and means for indicating the deflection of said beam, an amplifier tube having an anode, a cathode and a control grid, said deflection controlling means being connected to said anode, means for controlling the amplification of said tube in accordance with said electrical values whereby the said values are indicated by said deflection indicating means, said last-mentioned means comprising means for supplying a voltage varying as said electrical values to said control grid, a plurality of sources of alternating voltage, means for applying voltage from one of said sources of alternating voltage to said deflection indicating means, means for applying voltage from one of said sources of alternating voltage to said anode comprising an impedance connected between said anode and the said one of said sources of alternating voltage, means for applying voltage from one of said sources of alternating voltage to said beam producing means, means for applying voltage from one of said sources of alternating voltage to said cathode thereby to render said tube selectively conductive, said sources of alternating voltage being conductive for direct currents, the voltages applied by said sources of alternating voltage having substantially the same frequency and substantially the same waveshape and being of predetermined fixed relative phase relation, the frequencies of the said last-mentioned voltages being high relative to said voltage varying as said electrical values, and means connected to one of the anode and cathode of said amplifier tube for varying the angle of current flow of said indicating device in accordance with the angle of current flow of the said tube.

24. A circuit arrangement for indicating electrical values comprising an electron discharge indicating device having means for producing an electron beam, means for controlling the deflection of said beam and means for indicating the deflection of said beam, an amplifier tube having an anode, a cathode and a control grid, said deflection controlling means being connected to said anode, means for controlling the amplification of said tube in accordance with said electrical values whereby the said values are indicated by said deflection indicating means, said last-mentioned means comprising means for supplying a voltage varying as said electrical values to said control grid, a plurality of sources of alternating voltage, means for applying voltage from one of said sources of alternating voltage to said deflection indicating means, means for applying voltage from one of said sources of alternating voltage to said anode comprising a resistor connected between said anode and the said one of said sources of alternating voltage, means for applying voltage from one of said sources of alternating voltage to said beam producing means, means for applying voltage from one of said sources of alternating voltage to said cathode thereby to render said tube selectively conductive, said sources of alternating voltage being conductive for direct currents, the voltages applied by said sources of alternating voltage having substantially the same frequency and substantially the same waveshape and being of predetermined fixed relative phase relation, the frequencies of the said last-mentioned voltages being high relative to said voltage varying as said electrical values, and means for combining a direct voltage component with the voltage applied to one of the anode and cathode of said amplifier tube in a manner whereby the angle of current flow of said indicating device is varied in accordance with the angle of current flow of the said tube.

25. A circuit arrangement for indicating electrical values comprising an electron discharge indicating device having means for producing an electron beam, means for controlling the deflection of said beam and means for indicating the deflection of said beam, an amplifier tube having an anode, a cathode and a control grid, said deflection controlling means being connected to said anode, means for controlling the amplification of said tube in accordance with said electrical values whereby the said values are indicated by said deflection indicating means, said last-mentioned means comprising means for supplying a voltage varying as said electrical values to said control grid, a plurality of sources of alternating voltage, means for applying voltage from one of said sources of alternating voltage to said deflection indicating means, means for applying voltage from one of said sources of alternating voltage to said anode comprising a first resistor connected between said anode and the said one of said sources of alternating voltage, means for applying voltage from one of said sources of alternating voltage to said beam producing means, and means for applying voltage from one of said sources of alternating voltage to said cathode thereby to render said tube selectively conductive comprising a second resistor connected between said cathode and said last-mentioned one of said sources and a capacitor connected in shunt across said second resistor, the time constant of said last-mentioned resistor and capacitor substantially exceeding the period of the voltages applied by said sources of alternating voltage, said sources of alternating voltage being conductive for direct currents, the voltages applied by said sources of alternating voltage having substantially the same frequency and substantially the same waveshape and being of predetermined fixed relative phase relation, the frequencies of the said last-mentioned voltages being high relative to said voltage varying as said electrical values.

References Cited in the file of this patent
UNITED STATES PATENTS

| | | |
|---|---|---|
| 2,263,932 | Schnall | Nov. 25, 1941 |
| 2,318,140 | Clark | May 4, 1943 |
| 2,395,725 | Crosby | Feb. 26, 1946 |
| 2,542,021 | Fox | Feb. 20, 1951 |